(12) United States Patent
Kim et al.

(10) Patent No.: US 8,988,412 B2
(45) Date of Patent: Mar. 24, 2015

(54) DRIVING METHOD OF A DISPLAY DEVICE

(75) Inventors: Yoon Gu Kim, Seongnam-si (KR); Tae Hyung Kim, Anyang-si (KR); Hyeon Yong Jang, Hwaseong-si (KR); Sang Min Jeon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 190 days.

(21) Appl. No.: 13/537,821

(22) Filed: Jun. 29, 2012

(65) Prior Publication Data

US 2013/0207955 A1   Aug. 15, 2013

(30) Foreign Application Priority Data

Feb. 13, 2012 (KR) .................. 10-2012-0014490

(51) Int. Cl.
*G06F 3/038* (2013.01)
*G06T 15/00* (2011.01)

(52) U.S. Cl.
CPC ..................................... *G06F 3/038* (2013.01)
USPC .......................................... 345/212; 345/419

(58) Field of Classification Search
CPC .......... H04N 13/0438; H04N 13/0497; G09G 2310/08; G09G 2310/0237; G09G 2320/02309; G09G 2320/0209; G09G 3/3406
USPC .................. 345/212, 419; 348/56, E13.04
See application file for complete search history.

(56) References Cited

U.S. PATENT DOCUMENTS

| | | | |
|---|---|---|---|
| 5,969,850 A | 10/1999 | Harrold et al. | |
| 6,977,629 B2 | 12/2005 | Weitbruch et al. | |
| 7,724,211 B2 | 5/2010 | Slavenburg et al. | |
| 2006/0238487 A1* | 10/2006 | Shih | 345/102 |
| 2008/0151040 A1 | 6/2008 | Kim | |
| 2011/0050863 A1 | 3/2011 | Choi et al. | |
| 2011/0058016 A1 | 3/2011 | Hulyalkar et al. | |
| 2011/0090308 A1 | 4/2011 | Chen et al. | |
| 2011/0109733 A1* | 5/2011 | Kim et al. | 348/56 |
| 2011/0122227 A1 | 5/2011 | Kim | |
| 2012/0033060 A1* | 2/2012 | Ko | 348/56 |
| 2012/0038624 A1* | 2/2012 | Slavenburg | 345/419 |
| 2012/0069164 A1* | 3/2012 | Nakagawa et al. | 348/56 |

FOREIGN PATENT DOCUMENTS

| | | |
|---|---|---|
| JP | 2009-152897 | 7/2009 |
| JP | 2011-077785 | 4/2011 |
| KR | 1020080059937 | 7/2008 |
| KR | 1020110041736 A | 4/2011 |
| KR | 1020110080773 A | 7/2011 |

* cited by examiner

*Primary Examiner* — Kent Chang
*Assistant Examiner* — Mark Edwards
(74) *Attorney, Agent, or Firm* — Innovation Counsel LLP

(57) ABSTRACT

A driving method of a display device includes: a display panel having a plurality of first blocks, a data driver applying data voltages to pixels of the plurality of first blocks, and a backlight having a plurality of second blocks respectively corresponding to the plurality of first blocks of the display panel, applying the data voltages to the pixels of the plurality of the first blocks during a plurality of data input periods corresponding to the plurality of the first blocks for one frame by the data driver, and a vertical blank period having no applied date voltage is positioned between the plurality of data input periods.

20 Claims, 9 Drawing Sheets

| | |
|---|---|
| 300 | display panel |
| 600 | timing controller |
| IDAT | input image signal |
| CONT1 | input control signal |

DRIVING METHOD OF A DISPLAY DEVICE

CROSS-REFERENCE TO RELATED APPLICATION

This application claims priority to, and the benefit of, Korean Patent Application No. 10-2012-0014490 filed in the Korean Intellectual Property Office on Feb. 13, 2012, the entire contents of which are incorporated herein by reference.

BACKGROUND OF THE INVENTION (a) Field of the Invention

Embodiments of the present invention relate generally to a display device and a driving method thereof. More specifically, embodiments of the present invention relate to driving methods of 3D display devices.

(b) Description of the Related Art

A display device includes a display panel including a plurality of pixels for displaying an image and a plurality of display signal lines connected with switching elements included in the pixels, a gate driver transmitting a gate-on voltage and a gate-off voltage to a gate line among the display signal lines to turn on/off the switching element of the pixel, a data driver transmitting a data voltage to a data line among the display signal lines to apply the data voltage to the pixel through the turned-on switching element, and the like.

A liquid crystal display (LCD), an organic light emitting diode display (OLED display), an electrophoretic display, and the like are typical displays adopting the above configuration.

Each pixel of the display device further includes a pixel electrode receiving the data voltage through the switching element and an electro-optical active layer converting the data voltage into an optical signal to display an image in the display panel. The liquid crystal display includes a liquid crystal layer as the electro-optical active layer, the OLED display includes an organic emission layer as the electro-optical active layer, and the electrophoretic display may include charged particles as the electro-optical active layer.

Recently, due to development in display device technologies, a display device capable of displaying a 3 dimensional (3D) image has been attracting attention.

In general, in a 3D image display technology, stereoscopic perception of an object is embodied by using a binocular parallax for recognizing the stereoscopic perception in a near distance. That is, when different 2D images are reflected in a left eye and a right eye, respectively, and the image reflected in the left eye (hereinafter, referred to as a "left eye image") and the image reflected in the right eye (hereinafter, referred to as a "right eye image") are transmitted to a brain, the left eye image and the right eye image are combined in the brain to be recognized as a 3D image having depth perception or stereoscopic perception.

The display device capable of displaying the 3D image uses the binocular parallax and includes a stereoscopic method using glasses such as shutter glasses, polarized glasses, or the like and an autostereoscopic method in which lenticular lens, a parallax barrier, or the like is disposed in a display device without using glasses.

Each pixel of the display device which displays 2D images or 3D images may display different images according to a framedata. When images of adjacent frames are different from each other and a response speed of the electro-optical active layer is not fast enough, a portion of images of the adjacent frames may be overlapped. As a result, the images become unclear. This phenomenon is referred to as a crosstalk.

In particular, each pixel of the display device which displays 3D images may alternately display left eye images and right eye images in adjacent frames or may display any one of the left eye images and the right eye images in the consecutive frames. In any case, when the images in the consecutive frames are different from each other and a response speed of the electro-optical active layer of the display device is not fast enough, the images of consecutive frames may overlap. As a result, crosstalk may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide driving methods having an advantage of increasing display quality by reducing a crosstalk.

Further, the present invention has been made in an effort to provide driving methods having an advantage of increasing luminance.

An exemplary embodiment of the present invention provides a driving method of a display device having a display panel including a plurality of first blocks, a data driver applying data voltages to pixels of the plurality of first blocks, and a backlight having a plurality of second blocks respectively corresponding to the plurality of first blocks of the display panel, the method including: applying the data voltages to the pixels of the plurality of the first blocks during a plurality of data input periods corresponding to the plurality of the first blocks for one frame by the data driver, wherein a vertical blank period having no applied date voltage is positioned between the plurality of data input periods. The driving method of a display device may further include emitting light of corresponding second blocks of the back light when a predetermined time passes after applying the data voltages to the first blocks, wherein the predetermined time is 0 or more. Emission periods of adjacent second blocks of the backlight may overlap each other.

A time width of a first data input period and a time width of a second data input period among the plurality of data input periods of one frame may be different from each other.

A time width of the vertical blank period after the first data input period may be different from a time width of the vertical blank period after the second data input period.

The pixel may alternately display a left eye data voltage and a right eye data voltage every frame.

According to the exemplary embodiments of the present invention, it is possible to improve display quality and increase luminance by reducing a crosstalk of a display device.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

First, a display device according to an exemplary embodiment of the present invention will be described with reference to FIG. 1.

Figure 1:
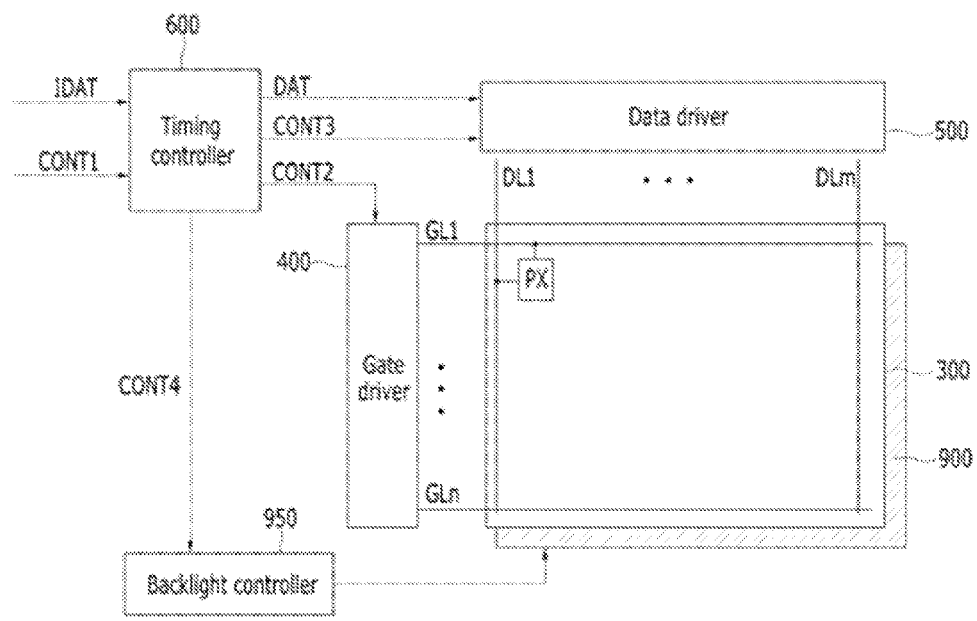
FIG. 1 is a block diagram illustrating a display device according to an exemplary embodiment of the present invention.

FIG. 1 is a block diagram illustrating a display device according to an exemplary embodiment of the present invention.

Referring to FIG. 1, a display device according to an exemplary embodiment of the present invention may be one of various display devices such as a liquid crystal display, an electrophoretic display, an electrowetting display (EWD), a MEMS display, and the like.

The display device according to the exemplary embodiment of the present invention includes a display panel 300 displaying an image, a gate driver 400 and a data driver 500 which are connected the display panel 300, a backlight controller 950, a timing controller 600 controlling the gate driver 400 and the data driver 500, a backlight 900 supplying light to the display panel 300, and the like.

The display panel 300 includes a plurality of display signal lines and a plurality of pixels PX connected thereto. The plurality of pixels PX may be arranged in a matrix form. The display signal lines include a plurality of gate lines GL1-GLn transmitting gate signals (also referred to as "scan signals") and a plurality of data lines DL1-DLm transmitting a data voltage. Each pixel PX may include a switching element (not shown) such as a thin film transistor and the like connected to one of the corresponding gate lines GL1-GLn, the corresponding data lines DL1-DLm and a pixel electrode (not shown) connected thereto.

The display panel 300 may further include an electro-optical active layer which converts the data voltage Vd applied to the pixel electrode to an optical signal to display an image. For example, the liquid crystal display includes a liquid crystal layer as the electro-optical active layer and the electrophoretic display may include charged particles as the electro-optical active layer and the like.

The timing controller 600 controls operations of the gate driver 400, the data driver 500, the backlight controller 950, and the like.

The timing controller 600 receives an input image signal IDAT and an input control signal CONT1 from the outside. The input image signal IDAT includes luminance information of the image. The luminance may have a predetermined number, for example, 1024 ($=2^{10}$), 256 ($=2^8$), or 64 ($=2^6$) of gray levels. The input control signal CONT1 may include a vertical synchronization signal Vsync, a horizontal synchronizing signal Hsync, a main clock MCLK, and a data enable signal DE, and the like.

The timing controller 600 may generate waveforms suitable for an operation of the display panel 300 such as a gate control signal CONT2, a data control signal CONT3, a backlight control signal CONT4, and the like based on the input image signal IDAT and the input control signal CONT1. The timing controller 600 may transmit a gate control signal CONT2 to the gate driver 400, transmit a data control signal CONT3 and a processed image signal DAT to the data driver 500, and transmit a backlight control signal CONT4 to the backlight controller 950.

The data driver 500 is connected to the data lines DL1-DLm of display panel 300 and may generate gray voltage levels for the entire gray levels based on a gray reference voltages received from a gray voltage generator (not shown) or may receive a plurality of gray voltage levels from a gray voltage generator (not shown). The data driver 500 receives a digital image signal DAT for the pixels PX of one row according to the data control signal CONT3 and selects a gray voltage level corresponding to the digital image signal DAT from the gray voltage levels to convert the digital image signal DAT into a data voltage Vd and then apply the data voltage Vd to one of the corresponding data lines DL1-DLm.

The gate driver 400 is connected to the gate lines GL1-GLn and applies gate signals such as a gate-on voltage Von and a gate-off voltage Voff to the gate lines GL1-GLn. The gate driver 400 applies the gate-on voltage Von to the gate lines GL1-GLn according to the gate control signal CONT2 received from the timing controller 600 to turn on the switching element connected to the gate lines GL1-GLn. Then, data voltages Vd applied to the data lines DL1-DLm may be applied to the corresponding pixels PX through the turned-on switching elements.

The backlight 900 may be disposed behind the display panel 300 and may include at least one light source. Examples of the light source may include a fluorescent lamp such as a cold cathode fluorescent lamp (CCFL), a light emitting diode (LED), organic light emitting diode (OLED) and the like. The light source included in the backlight 900 may be turned on or turned off for a predetermined time according to the control of the backlight controller 950 by the backlight control signal CONT4. The backlight 900 may further include at least one linear light guide plate which faces the display panel 300.

The display panel 300 sequentially applies the gate-on voltage Von to all the gate lines GL1-GLn during 1 horizontal period (also referred to as "1H" and being the same as one period of the horizontal synchronizing signal Hsync and the data enable signal DE) and applies the data voltages Vd to all the pixels PX to display the image of one frame.

Next, a display device capable of displaying a 3D image according to an exemplary embodiment of the present invention will be described with reference to FIG. 2. Like reference numerals designate the same constituent elements as the exemplary embodiment described above and the duplicated description is omitted.

Figure 2:
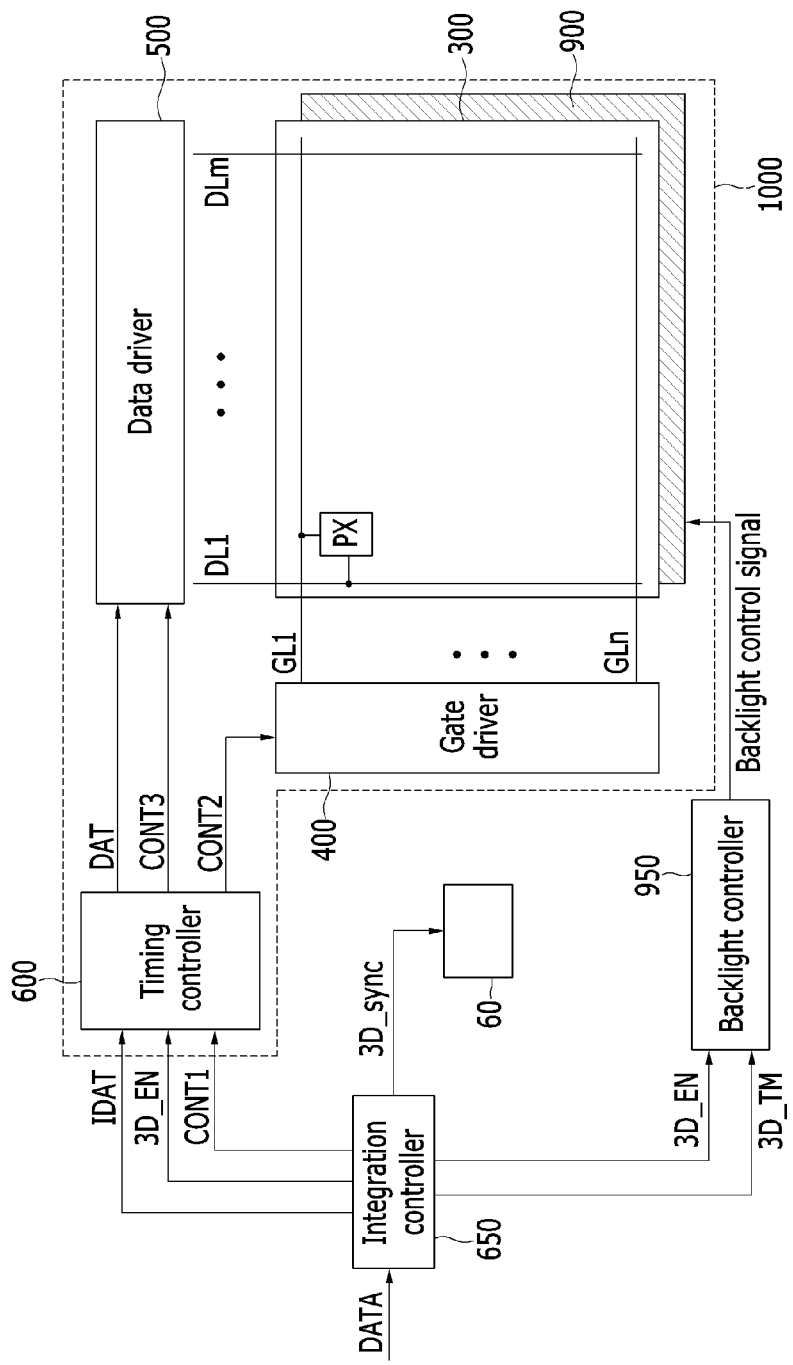
FIG. 2 is a block diagram illustrating a display device capable of displaying a 3D image according to an exemplary embodiment of the present invention.
Figure 3:
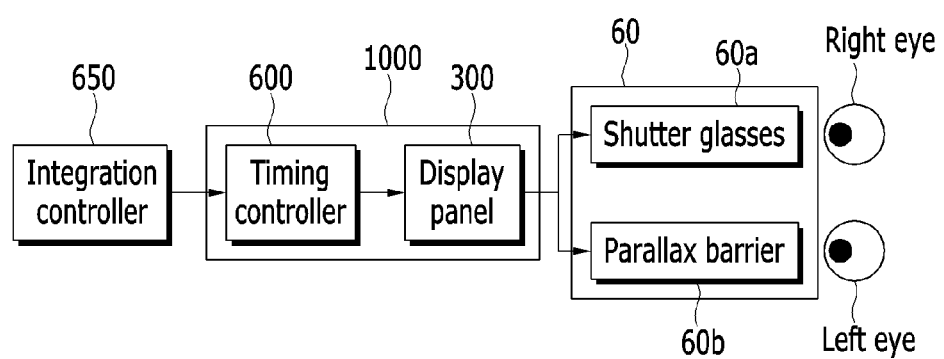
FIG. 3 is a block diagram illustrating a display device capable of displaying a 3D image according to an exemplary embodiment of the present invention.

FIGS. 2 and 3 are block diagrams of a display device capable of displaying a 3D image according to an exemplary embodiment of the present invention, respectively.

Since the display device capable of displaying a 3D image according to the exemplary embodiment of the present invention includes almost all of the constituent elements of the display device shown in FIG. 1, differences from the exemplary embodiment shown in FIG. 1 will be mainly described.

Referring to FIG. 2, the display device capable of displaying a 3D image according to the exemplary embodiment of the present invention (hereinafter, referred to as a "3D image display device") may include an integration controller 650, a display panel assembly 1000, a backlight controller 950, and a 3D image recognition member 60.

The integration controller 650 receives image information DATA from the outside to generate an input image signal IDAT, a 3D enable signal 3D_EN, a 3D timing signal 3D_TM, a 3D synchronization signal 3D_sync, an input control signal CONT1 controlling display of the input image signal IDAT, and the like. The integration controller 650 may transmit the input image signal IDAT, the 3D enable signal 3D_EN, the input control signal CONT1, and the like to the timing controller 600 of the display panel assembly 1000, transmit the 3D enable signal 3D_EN and the 3D timing signal 3D_TM to the backlight controller 950, and transmit the 3D synchronization signal 3D_sync to the 3D image recognition member 60.

The 3D enable signal 3D_EN instructs the 3D image display device to operate in a 3D mode and the 3D timing signal 3D_TM may include timing information of many driving signals according to the 3D mode. The 3D synchronization signal 3D_sync is a signal capable of controlling an operation of the 3D image recognition member 60 in the 3D mode.

The display panel assembly 1000 may be one of various display devices such as a liquid crystal display, an electrophoretic display, an electrowetting display (EWD), a MEMS display, and the like.

The display panel assembly 1000 may include a display panel 300, a gate driver 400, a data driver 500, a timing controller 600, and a backlight 900. Since the description thereof is almost the same as the description for the exemplary embodiment shown in FIG. 1, hereinafter, a detailed description is omitted.

The timing controller 600 may operate in a 2D mode for displaying a 2D planar image or a 3D mode for displaying a 3D image according to the 3D enable signal 3D_EN received from the integration controller 650.

In the 3D mode, the data voltage Vd may include a data voltage for a left eye image (referred to as "left eye data voltage") and a data voltage for a right eye image (referred to as "right eye data voltage"). One pixel PX may alternately display images corresponding to the right eye data voltage and the left eye data voltage in consecutive frames or may display images corresponding to data voltages for any one of the right eye and the left eye in consecutive frames.

A vertical blank period that no data voltage is applied may be inserted between a frame applying the left eye data voltage and a frame applying the right eye data voltage. The vertical blank period separate the left eye image and the right eye image to prevent a crosstalk in which the left eye image and the right eye image are recognized to overlap each other.

The backlight controller 950 receives the 3D timing signal 3D_TM, the 3D enable signal 3D_EN, and the like from the integration controller 650 to generate a backlight control signal based thereon and transmit the backlight control signal to the backlight 900. Unlike this, as shown in FIG. 1, the backlight controller 950 may also receive the backlight control signal from the timing controller 600. The backlight 900 may be turned on or turned off for a predetermined time according to the control of the backlight control signal The 3D image recognition member 60 is to implement 3D image displaying and generates binocular parallax by inputting the left eye image to the left eye and inputting the right eye image to the right eye. That is, the 3D image recognition member 60 allows images observed at different angles to be inputted to the left eye and to the right eye respectively, so that an observer feels a stereoscopic perception.

Referring to FIG. 3, the 3D image recognition member 60 may be shutter glasses 60a including a left eye shutter and a right eye shutter and may also be a parallax barrier 60b where a light shielding portion and a light transmitting portion are alternately formed along a horizontal direction, but is not limited thereto.

For example, in the case where the 3D image recognition member 60 is the shutter glasses 60a, when the display panel 300 alternately displays a left eye image and a right eye image, the left eye shutter and the right eye shutter of the shutter glasses 60a may block light in turn in synchronization therewith. The observer may recognize the image of the display panel 300 as a 3D image through the shutter glasses 60a.

In the case where the 3D image recognition member 60 uses the parallax barrier 60b, the parallax barrier 60b is positioned in front of the display panel 300 and the display panel 300 may alternately display the left eye image and the right eye image along a horizontal direction. A light shielding portion in which the light is not transmitted and a light transmitting portion in which the light is transmitted may be alternately formed in the parallax barrier 60b along the horizontal direction. The images from the display panel 300 are separated into the left eye image and the right eye image through the parallax barrier 60b. The light transmitting portion in a parallax barrier will allow the left image through to observer's left eye, and the right image through to observer's right eye. The 3D image recognition member 60 receives the 3D synchronization signal 3D_sync from the integration controller 650 and may be operated according to the received 3D synchronization signal 3D_sync. Alternatively, the 3D synchronization signal 3D_sync may be generated in the timing controller 600 and transmitted to the 3D image recognition member 60.

Then, a detailed driving method of the display device will be described with reference to FIGS. 4 and 5 together with FIGS. 1 to 3.

Figure 4:
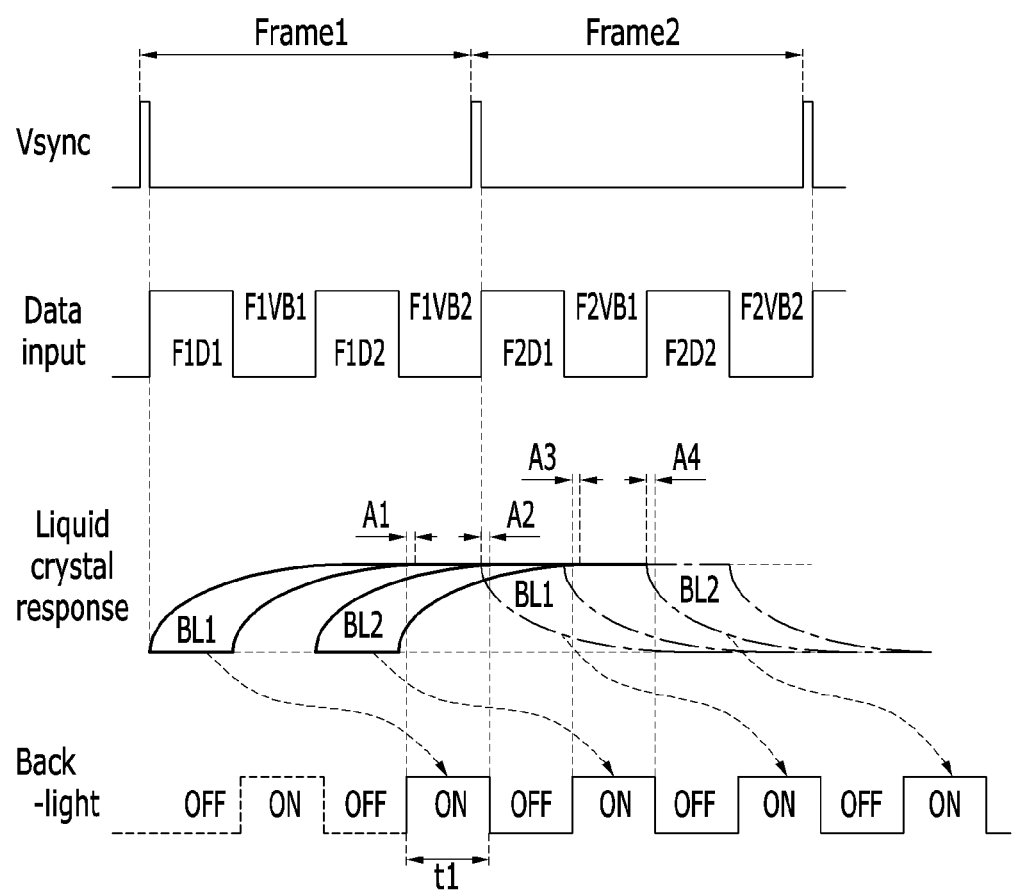
FIG. 4 is a timing diagram illustrating a driving signal of a display device according to an exemplary embodiment of the present invention.
Figure 5:
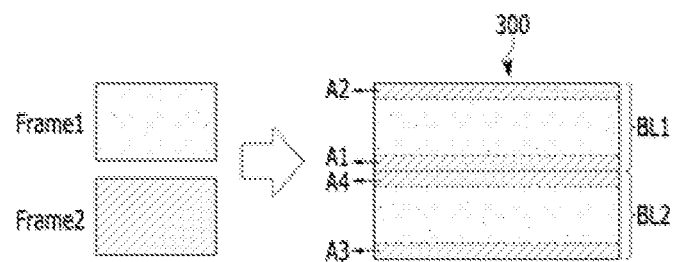
FIG. 5 is a diagram showing an example of an image displayed according to a waveform diagram of the driving signal shown in FIG. 4.

FIG. 4 is a timing diagram illustrating a driving signal of a display device according to an exemplary embodiment of the present invention and FIG. 5 is a diagram showing an example of an image displayed according to a waveform diagram of the driving signal shown in FIG. 4.

Referring to FIG. 4, a pulse of the vertical synchronization signal Vsync is generated on a one-frame cycle and one frame Frame1 or Frame2 starts according to the vertical synchronization signal Vsync. In the exemplary embodiment, two subsequent frames are called as a first frame Frame1 and a second frame Frame2.

When the pulse of the vertical synchronization signal Vsync is inputted to a gate driver, the gate driver 400 applies the gate-on voltage Von to the gate lines GL1-GLn in sequence according to the gate control signal CONT2 from the timing controller 600. The data driver 500 applies the data voltages Vd to the data lines DL1-DLm according to the data control signal CONT3. Then, the corresponding data voltages Vd are applied to the pixels PX of the display panel 300.

In the case that the display device is a 3D image display device, a left eye data voltage is inputted in the first frame Frame1 for each pixel PX and a right eye data voltage is applied in the second frame Frame2, or vice versa. Further, one pixel PX may receive data voltages corresponding to images to be inputted to one eye in consecutive frames depending on a kind of the 3D image recognition member 60.

When the data voltage Vd is applied to the pixel PX, the electro-optical active layer included in the pixel PX converts the data voltage Vd into an optical signal and as a result, the backlight 900 emits light to display an image having a gray level corresponding to the data voltage Vd. In the case where the display device is the liquid crystal display, an electric field is applied in a liquid crystal layer according to the data voltage Vd and liquid crystal molecules of the liquid crystal layer are arranged according to the electric field to display the image by controlling polarization of incident light from the backlight 900 or the outside. Further, in the case where the display device is the 3D image display device, when the display panel 300 displays the image, the left eye image is transmitted to the left eye and the right eye image is transmitted to the right eye through the 3D image recognition member 60 described above. As a result, the observer can perceive 3D images.

Each emission period ON of the backlight 900 may start at a predetermined time after corresponding data input periods F1D1, F1D2, F2D1, and F2D2 end. The predetermined time may be a zero or greater time duration. The timing of the emission period ON of the backlight 900 may be properly determined according to a response speed of the electro-optical active layer such as the liquid crystal layer and the like. When the response speed of the electro-optical active layer is sufficiently fast, the emission period ON of the backlight 900 may start just after the corresponding data input periods F1D1, F1D2, F2D1, and F2D2. However, in the case when the response speed of the electro-optical active layer is not fast enough, the emission period ON of the backlight 900 may start after the electro-optical active layer almost completes its reaction as shown in FIG. 4.

The display panel 300 according to the exemplary embodiment of the present invention may be divided into a plurality of blocks, and the backlight 900 may also be divided into a plurality of blocks which face and correspond to the plurality of blocks of the display panel 300. In this case, each block of the backlight 900 may include at least one linear light guide plate.

The exemplary embodiment shown in FIGS. 4 and 5 shows an example in which the display panel 300 and the backlight 900 are divided into two blocks BL1 and BL2, respectively. Herein, the plurality of blocks BL1 and BL2 of the display panel 300 and the backlight 900 may be arranged along a vertical direction where the data lines DL1-DLm extend like a display panel 300 shown in FIGS. 1 and 2. Thereafter, for convenience, the plurality of blocks of the display panel 300 and the plurality of blocks of the backlight 900 corresponding thereto are represented by the same reference numerals.

Referring to FIG. 4, in the case when the display panel 300 and the backlight 900 are divided into two blocks, the data voltages Vd to be inputted to each pixel PX for one frame Frame1 or Frame2 are also divided according to the number of the plurality of blocks BL1 and BL2, and are inputted during the plurality of data input periods F1D1, F1D2, F2D1, and F2D2. The data input period F1D1 is a period when the data voltage is inputted to the first block BL1 of the display panel 300 for the first frame Frame1 in sequence, the data input period F1D2 is a period when the data voltage is inputted to the second block BL2 of the display panel 300 for the first frame Frame1 in sequence, the data input period F2D1 is a period when the data voltage is inputted to the first block BL1 of the display panel 300 for the second frame Frame2 in sequence, and the data input period F2D2 is a period when the data voltage is inputted to the second block BL2 of the display panel 300 for the second frame Frame2 in sequence.

The adjacent data input periods F1D1, F1D2, F2D1, and F2D2 may be separated from each other by vertical blank periods F1VB1, F1VB2, F2VB1, and F2VB2 respectively. During the vertical blank periods F1VB1, F1VB2, F2VB1, and F2VB2, the data voltages are not applied to the display panel. Accordingly, one frame Frame1 or Frame2 includes a plurality of vertical blank periods F1VB1, F1VB2, F2VB1, and F2VB2.

In the case where the display device is a 3D image display device shown in FIGS. 2 and 3, the left eye data voltages are applied to the pixels PX during the data input periods F1D1 and F1D2 of the first frame Frame1, and the right eye data voltages are applied to the pixels PX during the data input periods F2D1 and F2D2 of the second frame Frame2, or vice versa.

When the data voltage is applied to each pixel PX, the electro-optical active layer operates in response. For example, in the case where the display device is the liquid crystal display, the liquid crystal molecules of the liquid crystal layer included in each of the blocks BL1 and BL2 respond by changing the alignment direction thereof according to the electric field generated depending on the data voltage applied to each of the blocks BL1 and BL2

Accordingly, the liquid crystal molecules may start the reaction at different times according to the blocks BL1 and BL2 which belong thereto, as shown in FIG. 4.

In detail, referring to FIG. 4, in the first frame Frame1, the liquid crystal molecules of the first block BL1 sequentially start the reaction according to the applied data voltage during the data input period F1D1. The liquid crystal response graphs shown in FIG. 4 are a set of the graphs illustrating the reaction degree or the response degree of the liquid crystal molecules. Similarly, in the first frame Frame1, the liquid crystal molecules of the second block BL2 sequentially start the reaction according to the applied data voltages during the data input period F1D2. Next, even in the second frame Frame2, the liquid crystal molecules of the first block BL1 sequentially start the reaction according to the applied data voltage during the data input period F2D1 and the liquid crystal molecules of the second block BL2 sequentially start the reaction according to the applied data voltage during the data input period F2D2. A time required to finish the reaction of the liquid crystal molecules and shapes of a slope in the liquid crystal response graph shown in FIG. 4 and the like may vary according to the condition of the liquid crystal layer.

The first block BL1 of the backlight 900 may emit light for a predetermined time width t1 at which point the liquid crystal molecules included in the first block BL1 of the display panel 300 have almost completed their reaction in each frame Frame1 or Frame2. Similarly, the second block BL2 of the backlight 900 may emit light for the predetermined time width t1 where the liquid crystal molecules included in the second block BL2 of the display panel 300 have almost completed their reaction in each frame Frame1 or Frame2. In FIG. 4, the emission periods ON corresponding to the first block BL1 and the second block BL2 of the backlight 900 are separated from each other by an interval, but alternatively, the emission periods ON of the first block BL1 and the second block BL2 may at least partially overlap each other. Further, the time interval between the adjacent emission periods ON may be the same, and the time width of the emission periods ON itself may be the same as well, but the time interval and the time width are not limited thereto.

In the exemplary embodiment, the total emission time of the backlight 900 for one frame Frame1 or Frame2 is 2×t1 which is two times of one emission periods ON. Furthermore, when the number of the divided blocks of the display panel 300 and the backlight 900 is n and the time width of each emission period ON is t1, the total emission time of the backlight 900 for one frame Frame1 or Frame2 may be n×t1.

Referring to FIGS. 4 and 5, the images of the corresponding frame Frame1 and the previous or subsequent frame Frame2 may appear to be mixed, such that the image of the corresponding frame may look unclear. This phenomenon is referred to as crosstalk. Crosstalk may occur in regions A1 and A3 in which the backlight 900 starts the light emission in each of the blocks BL1 and BL2 and the liquid crystal molecules of the corresponding block BL1 or BL2 substantially complete their reaction and regions A2 and A4 in which the backlight 900 ends the light emission in each of the blocks BL1 and BL2 and the liquid crystal molecules of the corresponding block BL1 or BL2 start their reaction.

In detail, referring to FIG. 5, a lower end of the first block BL1 of the display panel 300 corresponds to the region A1 of FIG. 4 in which the backlight 900 starts the light emission in the blocks BL1 and the liquid crystal molecules of the corresponding block BL1 substantially complete their reaction. In the lower end of the first block BL1 corresponding to the region A1, the reaction of the liquid crystal molecules corresponding to the data input period F1D1 is not completed, such that an afterimage of the previous frame may exist.

Further, an upper end of the first block BL1 of the display panel 300 corresponds to the region A2 of FIG. 4 in which the emission period ON is overlapped with a response region of the liquid crystal molecules which start the reaction according to the input data of the next frame Frame2. Accordingly, since in the upper end of the first block BL1 of the display panel 300, the liquid crystal molecules corresponding to the data input period F2D1 of the subsequent frame Frame2 start the reaction, the image of the first frame Frame1 and the image of the second frame Frame2 may be seen as mixed.

Similarly, the lower end of the second block BL2 corresponds to the region A3 of FIG. 4 in which the liquid crystal molecules are reacting in the emission period ON and thus the reaction of the liquid crystal molecules corresponding to the data input period F1D2 is not completed, such that the afterimage of the previous frame may exist. Further, the upper end of the second block BL2 corresponds to the region A4 of FIG. 4 in which the emission period ON is overlapped with a response region of the liquid crystal molecules which start the reaction according to the input data of the next frame Frame2 and thus the reaction of the liquid crystal molecules for the data input period F2D2 of the next frame Frame2 partially proceeds, such that the image of the first frame Frame1 and the image of the second frame Frame2 may be seen as mixed.

In an exemplary embodiment of the present invention, a size of each region A1, A2, A3, or A4 shown in FIG. 4 may be controlled by controlling the time width t1 of the emission period ON of the backlight 900 and accordingly, it is possible to reduce the crosstalk in which the images of the adjacent frames are recognized as mixed. Further, in the exemplary embodiment of the present invention, since the data voltages for one frame Frame1 or Frame2 are divided and inputted according to the blocks BL1 and BL2 of the display panel 300 and the backlight 900, crosstalk may be significantly reduced compared with the case where the display panel 300 and the backlight 900 are not divided into a plurality of blocks, and the total emission time of the backlight 900 for one frame may be increased to further increase the luminance of the display device. This will be described with reference to FIGS. 6 and 7.

Figure 6:
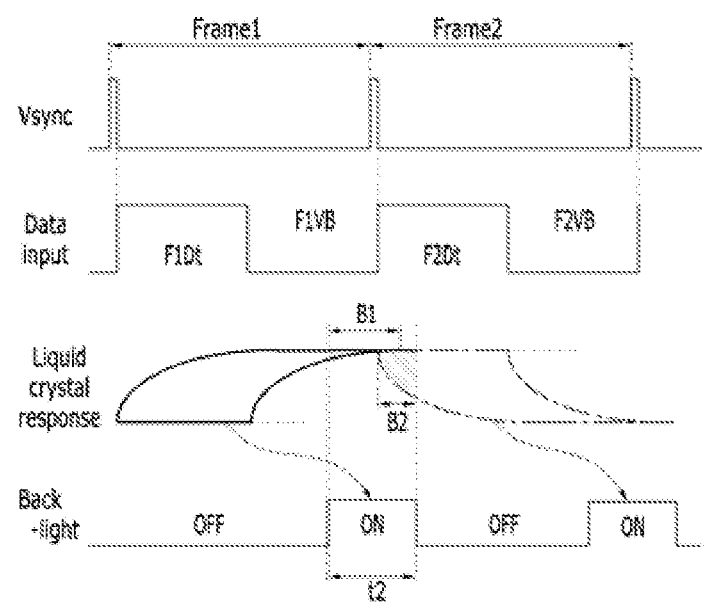
FIG. 6 is a timing diagram illustrating a driving signal of a display device according to another exemplary embodiment of the present invention.
Figure 7:
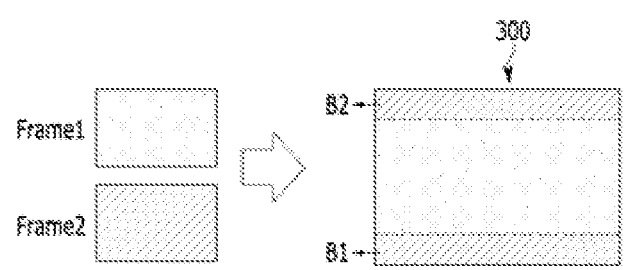
FIG. 7 is a diagram showing an example of an image displayed according to a waveform diagram of the driving signal shown in FIG. 6.

FIG. 6 is a timing diagram illustrating a driving signal of a display device according to another exemplary embodiment of the present invention and FIG. 7 is a diagram showing an example of an image displayed according to a waveform diagram of the driving signal shown in FIG. 6.

Referring to FIG. 6, in the exemplary embodiment, the display panel 300 and the backlight 900 are not divided into a plurality of blocks, but data voltages for one frame Frame1 or Frame2 are inputted to the display panel 300 during one data input period F1Dt or F2Dt. Vertical blank periods F1VB and F2VB may be positioned between data input periods F1Dt and F2Dt of adjacent frames Frame1 and Frame2.

The backlight 900 may begin its light emission at a time when liquid crystal molecules almost complete the reaction for each frame Frame1 and may emit light for a predetermined time width t2 by completing the light emission when the liquid crystal molecules start the reaction according to the applied data voltage of the next frame Frame2.

In this case, when the time width t2 of the emission period ON of the backlight 900 is increased, the luminance of the display device may be increased. However, crosstalk may be increased due to the regions B1 and B2 in FIGS. 6 and 7, where the reaction of the liquid crystal molecules are not finished, may be increased too. Thus, image quality may be deteriorated. On the contrary, when the time width t2 of the emission period ON is decreased, the crosstalk may be reduced, but the luminance may be decreased too.

In detail, referring to FIG. 7, the lower end of the display panel 300 corresponds to a region B1 of FIG. 6 where the liquid crystal molecules react according to the data input period F1Dt of the corresponding frame Frame1 while the backlight 900 emits light. In the region B1, the reaction of the liquid crystal molecules according to the data input period F1Dt is not completed, such that the afterimage of the previous frame may remain. Further, the upper end of the display panel 300 corresponds to a region B2 of FIG. 6 where the liquid crystal molecules start reaction according to the data input period F2Dt of the next frame Frame2 while the backlight 900 emits light. In the region B2, since the reaction of the liquid crystal molecules according to the data input period F2Dt of the next frame Frame2 is not completed, the image of the first frame Frame1 seems to be overlapped with the image of the second frame Frame2.

The time width t2 of the emission period ON of the backlight 900 may be controlled so that the crosstalk and the luminance may be optimized.

Comparing the exemplary embodiment shown in FIGS. 6 and 7 with the exemplary embodiment shown in FIGS. 4 and 5, when the time widths t1 and t2 of the emission period ON of the backlight 900 are set so that the crosstalk of the same degree occurs, in the exemplary embodiment shown in FIGS. 4 and 5 in which the display panel 300 and the backlight 900 are divided into two blocks, the total emission time 2×t1 of the backlight 900 for one frame Frame1 or Frame2 is larger than the total emission time of the backlight 900 for one frame Frame1 or Frame2 in the exemplary embodiment shown in FIGS. 6 and 7 in which the display panel 300 and the backlight 900 are not divided into two blocks. Accordingly, in the case of the exemplary embodiment shown in FIGS. 4 and 5, the luminance of the display device may be relatively increased while maintaining the degree of crosstalk. Further, in the case of the exemplary embodiment shown in FIGS. 4 and 5, the crosstalk may be much more decreased while maintaining the luminance.

Next, a display device according to an exemplary embodiment of the present invention and a driving method thereof will be described with reference to FIG. 8. Like reference numerals designate the same constituent elements as the exemplary embodiment described above and the duplicated description is omitted.

Figure 8:
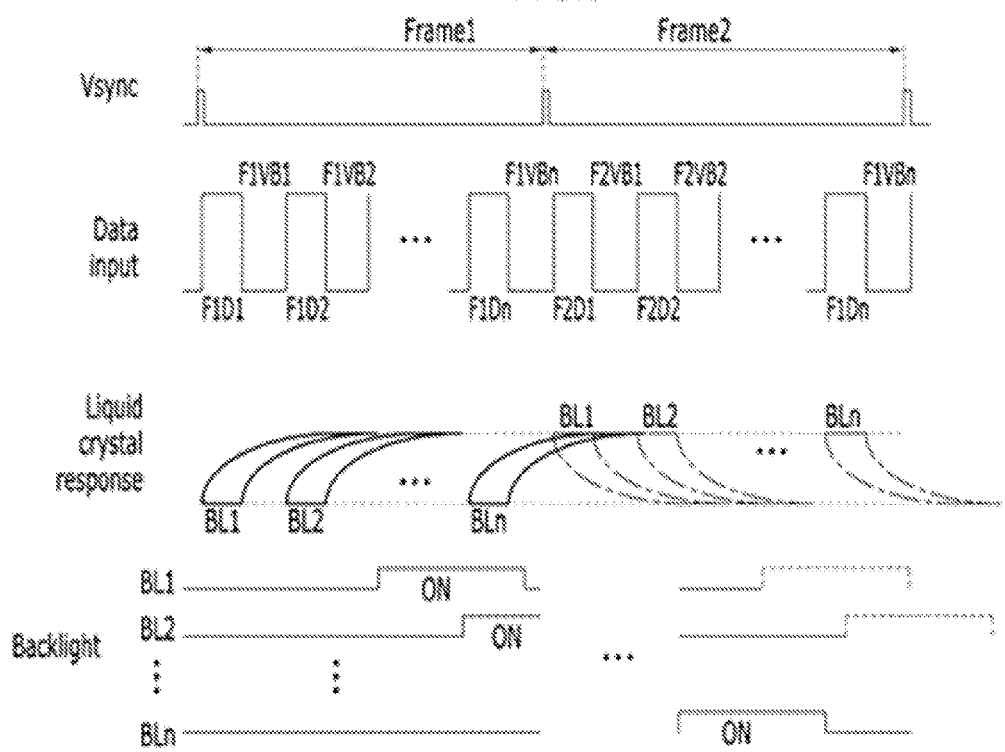
FIG. 8 is a timing diagram illustrating a driving signal of a display device according to an exemplary embodiment of the present invention.

FIG. 8 is a timing diagram illustrating a driving signal of a display device according to an exemplary embodiment of the present invention.

The display device according to the exemplary embodiment is almost the same as the exemplary embodiments shown in FIGS. 1 to 5 described above, but the number of the divided blocks of the display panel 300 and the backlight 900 and the number of the data input periods for one frame Frame1 or Frame2 corresponding to each block may vary.

Referring to FIG. 8, the display panel 300 according to the exemplary embodiment of the present invention may be divided into a plurality of blocks BL1, BL2, . . . , and BLn. Herein, n is a natural number of 2 or more and the case where n is 2 is the same as the exemplary embodiment shown in FIGS. 4 and 5 described above.

The backlight 900 is also divided into a plurality of blocks BL1, BL2, . . . , and BLn corresponding to the plurality of blocks BL1, BL2, . . . , and BLn of the display panel 300. Like the exemplary embodiment described above, the plurality of blocks BL1, BL2, . . . , and BLn may be divided along a vertical direction in which the data lines DL1-DLm extend, based on the display panel 300 shown in FIG. 1 or 2.

The image signal DAT inputted for one frame Frame1 and Frame2 and the accompanying data voltage Vd are also divided into n data input periods F1D1, F1D2, . . . , F1Dn and F2D1, F2D2, . . . , F2Dn according to the plurality of blocks BL1, BL2, . . . , and BLn. The adjacent data input periods F1D1, F1D2, . . . , F1Dn and F2D1, F2D2, . . . , F2Dn may be separated from each other by vertical blank periods F1VB1, F1VB2, . . . , F1VBn and F2VB1, F2VB2, . . . , F2VBn respectively.

In each frame Frame1 or Frame2, liquid crystal molecules corresponding to each of the blocks BL1, BL2, . . . , and BLn start the reaction in response to the application of the data voltage in the data input periods F1D1, F1D2, . . . , F1Dn and F2D1, F2D2, . . . , F2Dn.

In each frame Frame1 or Frame2, each of the blocks BL1, BL2, . . . , and BLn of the backlight 900 may emit light for a predetermined time from the time when the liquid crystal molecules included in each of the blocks BL1, BL2, . . . , and BLn of the corresponding display panel 300 almost complete their reaction. In FIG. 8, emission periods ON of the adjacent blocks BL1, BL2, . . . , and BLn of the backlight 900 are overlapped with each other, but unlike this, the emission periods ON of the adjacent blocks BL1, BL2, . . . , and BLn may also be separated from each other.

In one frame Frame1 or Frame2, the time width of the emission periods ON of the backlight 900 may be same, but may also not be same. For example, in one frame Frame1 or Frame2, in the case where the time widths of the data input periods F1D1, F1D2, . . . , F1Dn and F2D1, F2D2, . . . , F2Dn are different from each other, the time width of the emission period ON may also be different in response thereto. Similarly, the time widths of the vertical blank periods F1VB1, F1VB2, . . . , F1VBn and F2VB1, F2VB2, . . . , F2VBn may also be same in one frame Frame1 or Frame2, but may also be different according to the time widths of the data input periods F1D1, F1D2, . . . , F1Dn and F2D1, F2D2, . . . , F2Dn.

Further, since various features of the exemplary embodiment shown in FIGS. 4 and 5 described above may be equally applied to the exemplary embodiment, herein, the duplicated description is omitted.

Next, a display device and a driving method thereof according to an exemplary embodiment of the present invention will be described with reference to FIGS. 9 and 10. Like reference numerals designate the same constituent elements as the exemplary embodiment described above and the duplicated description is omitted.

Figure 9:
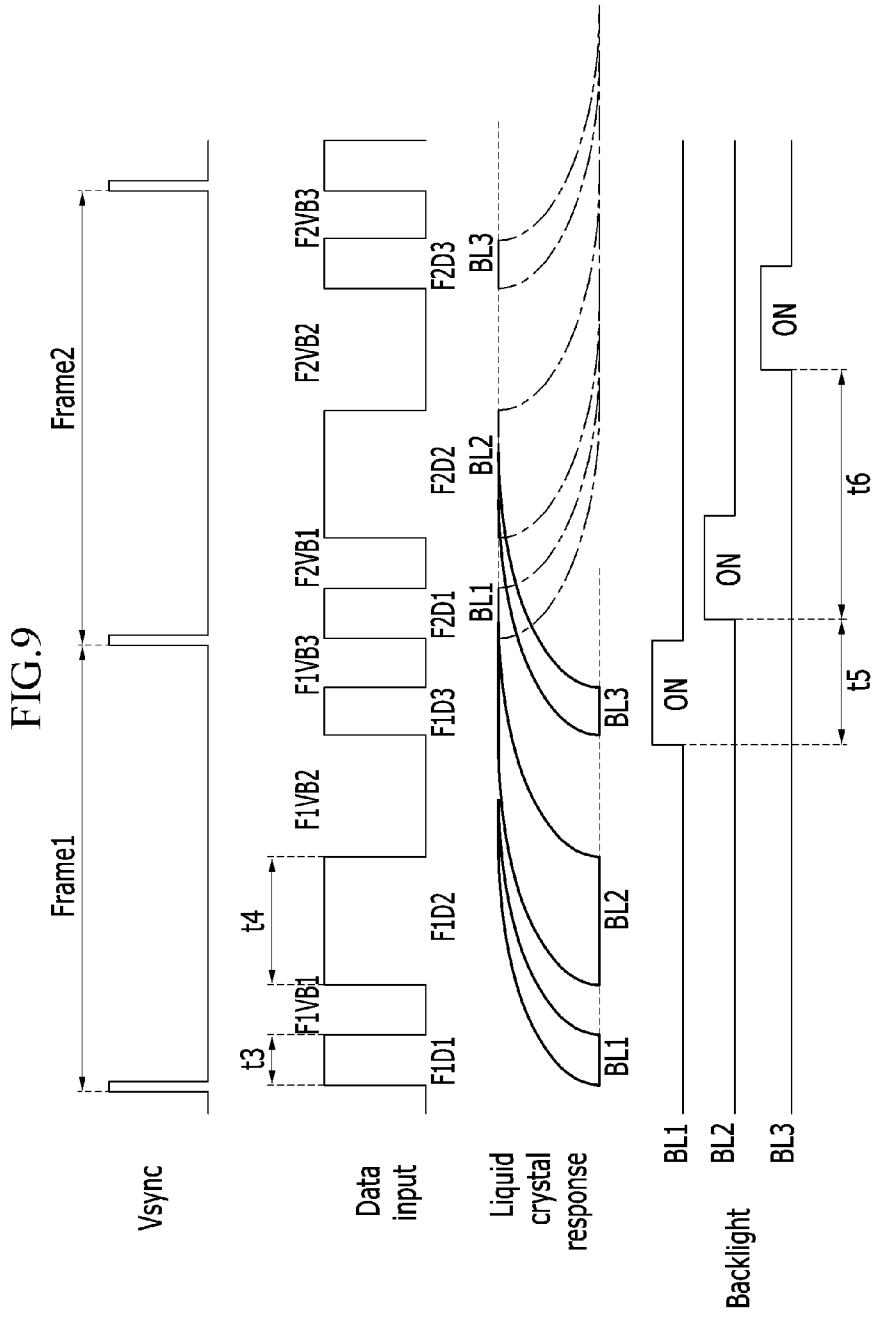
FIG. 9 is a timing diagram illustrating a driving signal of a display device according to an exemplary embodiment of the present invention.
Figure 10:
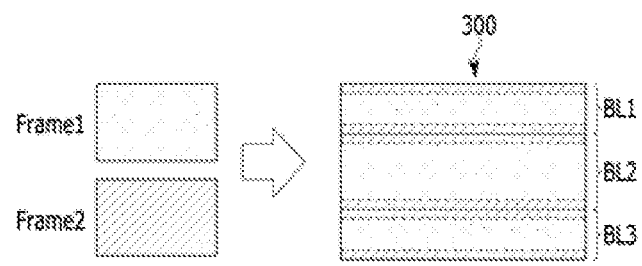
FIG. 10 is a diagram showing an example of an image displayed according to a waveform diagram of the driving signal shown in FIG. 9.

FIG. 9 is a timing diagram illustrating a driving signal of a display device according to an exemplary embodiment of the present invention and FIG. 10 is a diagram showing an example of an image displayed according to a waveform diagram of the driving signal shown in FIG. 9.

The display device according to the exemplary embodiment may be almost the same as the exemplary embodiments shown in FIGS. 1 to 5, or FIG. 8 described above. However, as shown in FIG. 10, the divided blocks of the display panel 300 and the backlight 900 may include blocks having different sizes. Accordingly, as shown in FIG. 9, the data input periods included in one frame Frame1 or Frame2 may include data input periods having different lengths.

Referring to FIG. 9, in the exemplary embodiment, for example, the image signal DAT or the data voltage Vd of one frame Frame1 or Frame2 is divided into three parts, but the configurations of the invention are not limited thereto. In the case of the exemplary embodiment shown in FIG. 9, the display panel 300 and the backlight 900 may also be divided into three blocks BL1, BL2, and BL3.

As shown in FIG. 9, at least one of data input periods F1D1, F1D2, F1D3, F2D1, F2D2, and F2D3 for one frame Frame1 or Frame2 may have a different time width from the rest of the data input periods. For example, in the first frame Frame1, a time width t3 of the data input period F1D1 may be different from a time width t4 of the data input period F1D2.

The time width of each vertical blank period F1VB1, F1VB2, F1VB3, F2VB1, F2VB2, or F2VB3 may vary according to the time width of the data input period F1D1, F1D2, F1D3, F2D1, F2D2, or F2D3 which is disposed directly in front thereof. As shown in FIG. 9, the time width of the vertical blank period F1VB2, which is positioned behind the data input period F1D2 having the relatively long time width t4, may be longer than the time width of the vertical blank period F1VB1 which is disposed behind the data input period F1D1 having the relatively short time width t3. In more detail, the time width of each of the vertical blank periods F1VB1, F1VB2, F1VB3, F2VB1, F2VB2, and F2VB3 may be proportional to the time width of the data input period F1D1, F1D2, F1D3, F2D1, F2D2, or F2D3 which is positioned directly in front thereof. However, the time width is not limited thereto and the time widths of the vertical blank periods F1VB1, F1VB2, F1VB3, F2VB1, F2VB2, and F2VB3 which are positioned in one frame Frame1 or Frame2 may also be irrelevant to the time widths of the data input periods F1D1, F1D2, F1D3, F2D1, F2D2, and F2D3 which are positioned directly in front thereof, or may also be the same.

The emission period ON of each block BL1, BL2, or BL3 of the backlight 900 may be positioned at the time when the liquid crystal molecules which react in response to the input of the data voltage Vd of each of the data input periods F1D1, F1D2, F1D3, F2D1, F2D2, and F2D3 almost complete the reaction. Further, time intervals t5 and t6 between start points of the emission periods ON of the adjacent blocks BL1, BL2, and BL3 of the backlight 900 may be determined according to the sum of the time widths of the corresponding vertical blank periods F1VB1, F1VB2, F1VB3, F2VB1, F2VB2, and F2VB3 and the time widths of the data input periods F1D1, F1D2, F1D3, F2D1, F2D2, and F2D3 which are positioned directly behind. Accordingly, as shown in FIG. 9, in the case where the time widths of the vertical blank periods F1VB1, F1VB2, F1VB3, F2VB1, F2VB2, and F2VB3 are substantially proportional to the time widths of the data input periods F1D1, F1D2, F1D3, F2D1, F2D2, and F2D3 which are positioned directly in front thereof, the time intervals t5 and t6 between start points of the emission periods ON of the adjacent blocks BL1, BL2, and BL3 of the backlight 900 may be proportional thereto.

However, the time intervals t5 and t6 between start points of the emission periods ON of the adjacent blocks BL1, BL2, and BL3 of the backlight 900 are not limited thereto and may be properly controlled. Further, the adjacent emission periods ON of the backlight 900 may not be overlapped with each other as shown in FIG. 9 and unlike this, may also be overlapped with each other.

Referring to FIG. 10, as described above, in the display panel 300 divided into three blocks BL1, BL2, and BL3, the images of two subsequent frames may be recognized to be mixed with each other between the adjacent blocks BL1, BL2, and BL3 or at the upper end or the lower end of the display panel 300. The crosstalk may be reduced by properly controlling the time widths of the emission periods ON of the backlight 900. In the exemplary embodiment of the present invention, since the data input periods F1D1, F1D2, F1D3, F2D1, F2D2, and F2D3 and the emission periods ON in one frame Frame1 or Frame2 exist in plural, the crosstalk may be reduced and the luminance of the display device may be increased.

Further, as shown in FIG. 10, when the lengths of the data input periods F1D1, F1D2, F1D3, F2D1, F2D2, and F2D3 for one frame Frame1 or Frame2 are different from each other, positions of interfaces between the blocks BL1, BL2, and BL3 of the display panel 300 may be freely selected. For example, when the time width of the data input period F1D2 or F2D2 which are positioned substantially at the center in each frame Frame1 or Frame2 is made relatively longer, that is, when the size of the block BL2 which is positioned substantially at the center of the display panel 300 is made relatively larger, the position of an interface between the blocks BL1, BL2, and BL3 at which the crosstalk occurs may be disposed at the edge of a screen where an observer may pay less attention, such that a display defect may be less apparent.

In the exemplary embodiments described above, the liquid crystal layer is exemplified as the electro-optical active layer of the display device, but in the case of other display devices other than the liquid crystal display, the exemplary embodiments of the present invention may be equally applied by changing the liquid crystal molecules into a corresponding electro-optical active layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 60: 3D image recognition member | 300: Display panel |
| 400: Gate driver | 500: Data driver |
| 600: Timing controller | 650: Integration controller |

-continued

<Description of symbols>

| | |
|---|---|
| 900: Backlight | 950: Backlight controller |
| 1000: Display panel assembly | DeletedTextsBL1, BL2, . . . , BLn: Block |

What is claimed is:

1. A driving method of a display device including a display panel having a plurality of first blocks arranged in a vertical direction, a data driver applying data voltages to pixels of the plurality of first blocks, and a backlight having a plurality of second blocks respectively corresponding to the plurality of first blocks of the display panel, the method comprising:
applying the data voltages for one frame to the first blocks respectively during a plurality of data input periods which are included in the one frame by the data driver, wherein a vertical blank period during which the data voltages are not input to the display panel is positioned in the middle of the one frame and between adjacent data input periods during the one frame, and
in the latter one of the adjacent data input periods, the data voltages for the pixels in the first blocks disposed in the middle of the display panel are applied from the data driver.

2. The driving method of a display device of claim 1, further comprising:
emitting light of corresponding second blocks of the backlight when a predetermined time passes after applying the data voltages to the first blocks,
wherein the predetermined time is 0 or more.

3. The driving method of a display device of claim 2, wherein emission periods of adjacent blocks of the backlight overlap each other.

4. The driving method of a display device of claim 3, wherein a time width of a first data input period and a time width of a second data input period among the plurality of data input periods of one frame are different from each other.

5. The driving method of a display device of claim 4, wherein a pixel of the pixels alternately displays a left eye data voltage and a right eye data voltage every frame.

6. The driving method of a display device of claim 5, wherein a time width of the vertical blank period after the first data input period is different from a time width of the vertical blank period after the second data input period.

7. The driving method of a display device of claim 1, wherein emission periods of adjacent blocks of the backlight overlap each other.

8. The driving method of a display device of claim 7, wherein a time width of a first data input period and a time width of a second data input period among the plurality of data input periods of one frame are different from each other.

9. The driving method of a display device of claim 8, wherein a pixel of the pixels alternately displays a left eye data voltage and a right eye data voltage every frame.

10. The driving method of a display device of claim 9, wherein a time width of the vertical blank period after the first data input period is different from a time width of the vertical blank period after the second data input period.

11. The driving method of a display device of claim 7, wherein a pixel of the pixels alternately displays a left eye data voltage and a right eye data voltage every frame.

12. The driving method of a display device of claim 11, wherein a time width of the vertical blank period after the first data input period is different from a time width of the vertical blank period after the second data input period.

13. The driving method of a display device of claim 1, wherein a time width of a first data input period and a time width of a second data input period among the plurality of data input periods of one frame are different from each other.

14. The driving method of a display device of claim 13, wherein a pixel of the pixels alternately displays a left eye data voltage and a right eye data voltage every frame.

15. The driving method of a display device of claim 14, wherein a time width of the vertical blank period after the first data input period is different from a time width of the vertical blank period after the second data input period.

16. The driving method of a display device of claim 1, wherein a pixel of the pixels alternately displays a left eye data voltage and a right eye data voltage every frame.

17. The driving method of a display device of claim 16, wherein a time width of the vertical blank period after the first data input period is different from a time width of the vertical blank period after the second data input period.

18. The driving method of a display device of claim 1, wherein a time width of a first data input period and a time width of a second data input period among the plurality of data input periods of one frame are different from each other.

19. The driving method of a display device of claim 18, further comprising:
  a third data input period after the second data input period,
  wherein a time width of the third data input period is same to the first data input period and the second data input period is longer than the time width of the first and third data input period.

20. The driving method of a display device of claim 19, wherein emission periods of adjacent blocks of the backlight overlap each other.

* * * * *